July 23, 1968 R. E. SMITH ET AL 3,393,475
GRINDING APPARATUS
Filed Jan. 19, 1965 3 Sheets-Sheet 1
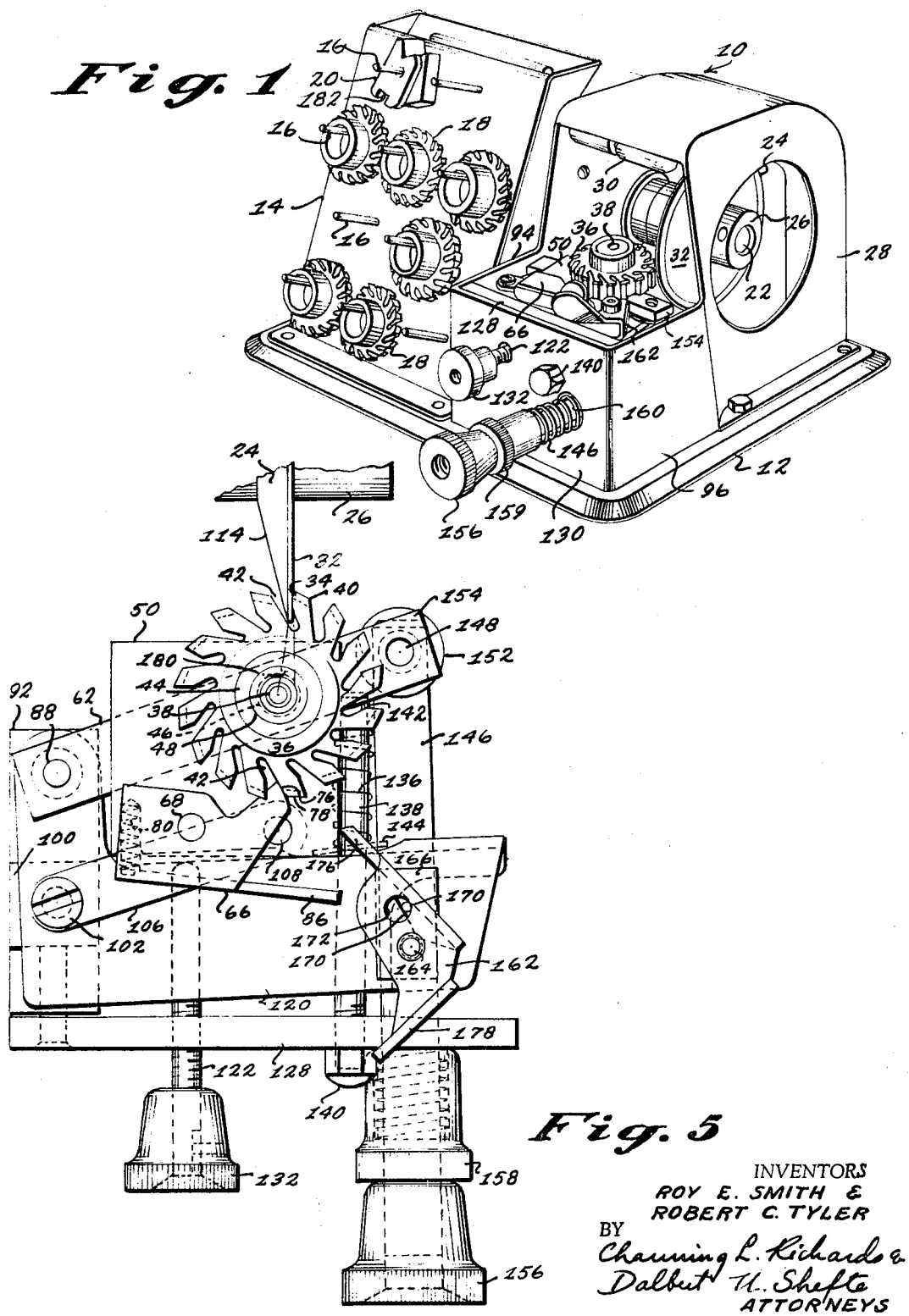
INVENTORS
ROY E. SMITH &
ROBERT C. TYLER
BY
Channing L. Richards &
Dalbert U. Shefte
ATTORNEYS

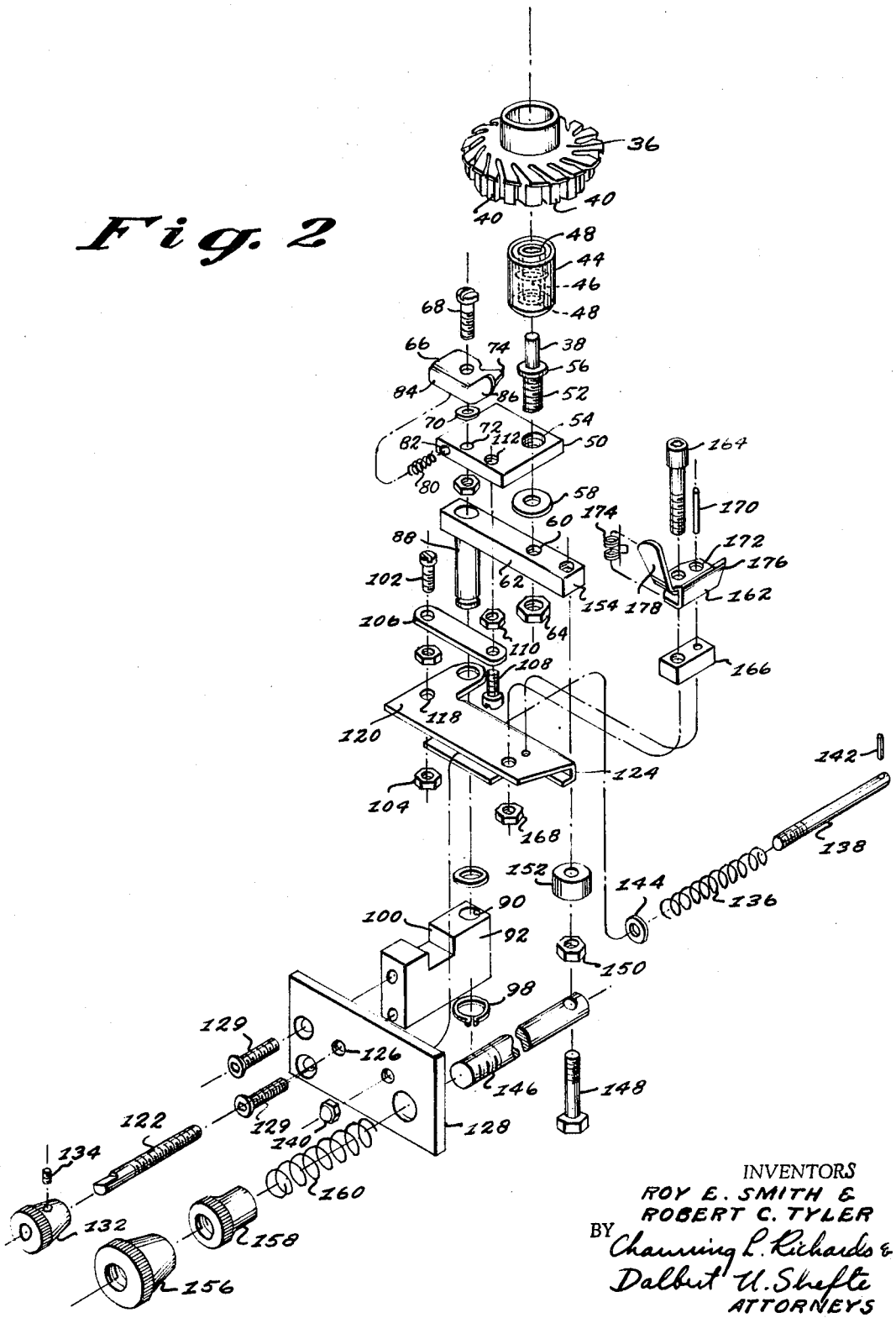

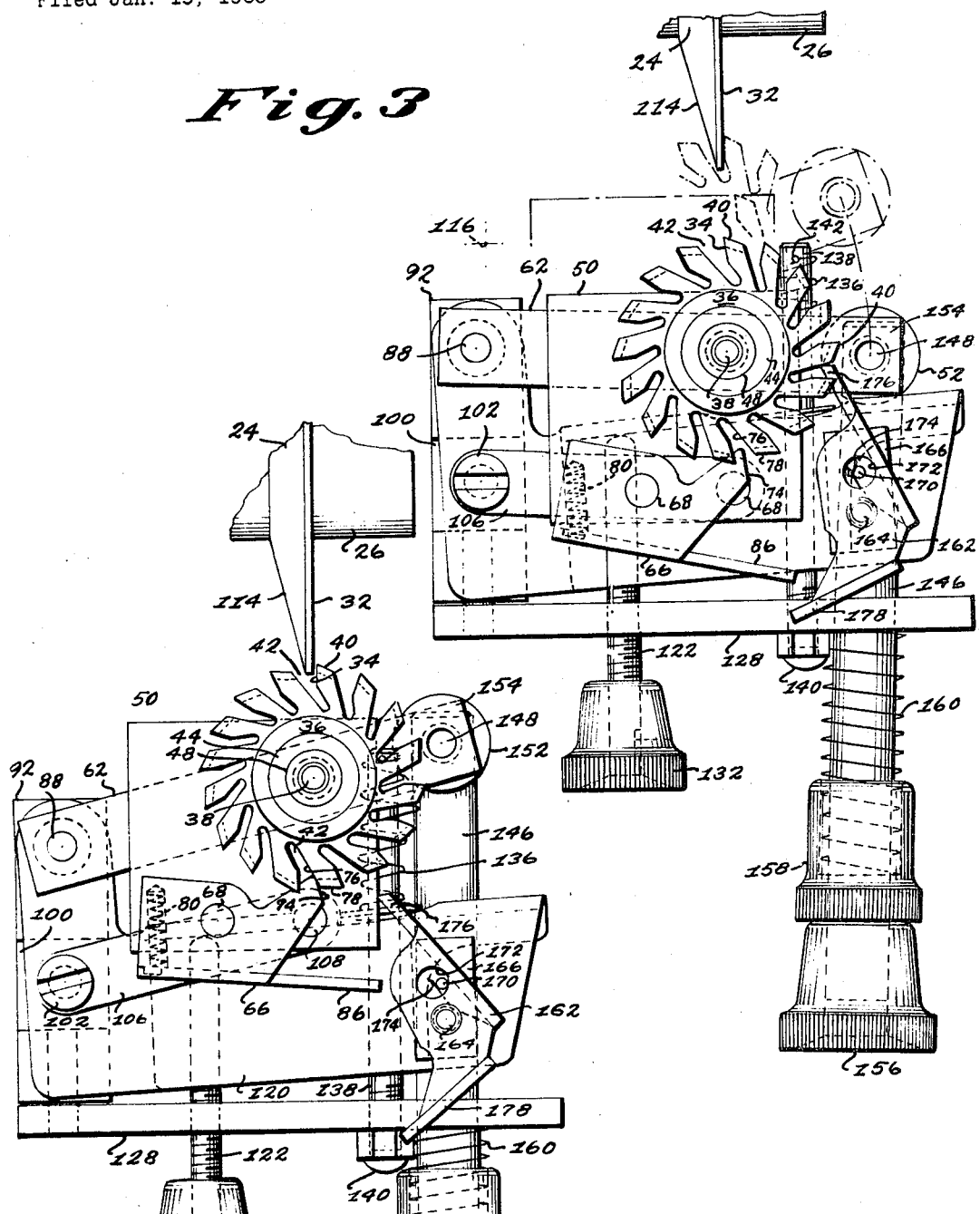

United States Patent Office 3,393,475
Patented July 23, 1968

3,393,475
GRINDING APPARATUS
Roy E. Smith and Robert C. Tyler, Atlanta, Ga., assignors to The Auto-Soler Company, a corporation of Georgia
Filed Jan. 19, 1965, Ser. No. 426,612
15 Claims. (Cl. 51—124)

ABSTRACT OF THE DISCLOSURE

Apparatus for grinding the cutting faces of a rotary toothed cutter including a pivotally mounted cutter support which positions a tooth of the cutter at a particular orientation with respect to the grinding face of a grinding wheel and maintains the tooth in this orientation while causing the cutter to be advanced toward the grinding wheel in an oblique curvilinear approach which locates the cutting face of the tooth within the periphery of the grinding wheel and then applies this cutting face evenly thereagainst. Provision is also made for indexing the rotary cutter to permit successive grinding of all of its teeth, and for controlling the rake and the depth to which the teeth are ground.

---

The present invention relates to a grinding apparatus, and more particularly to an apparatus for grinding the cutting faces of a rotary toothed cutter that operates to grind the cutting faces uniformly and expeditiously, providing precision sharpness easily and quickly in a manner that maintains uniform height and rake of the cutting faces such that the sharpened cutter will cut faster, cooler and cleaner and will have a prolonged wear life.

Briefly described, the grinding apparatus of the present invention has a grinding wheel and a support that incorporates first means for positioning a tooth of a rotary toothed cutter at a particular angular orientation with respect to the grinding face of the grinding wheel to position the cutting face of the tooth at a particular angle for grinding and second retractable means for advancing the supported cutter from a retracted position clear of the grinding wheel in an oblique curvilinear approach thereto while maintaining the angular orientation during approach and during grinding. With this arrangement, the cutting face of a cutter tooth, which is somewhat inaccessibly disposed at the side of the tooth and along the recess between teeth, is advanced to the grinding wheel and fed during grinding in a single direct operation that is easily and quickly performed while the angular orientation of the tooth is maintained to feed the cutting face uniformly during grinding, which provides a uniformly and precisely ground face without overheating or overgrinding of a portion of the face. This uniform, precise grinding of each cutting face results in a uniformity of all of the cutting faces of the cutter with a controlled rake and tooth height (distance from center of cutter to tip of tooth) for enhanced cutting operation and long wear life of the cutter.

These features are emphasized by arranging the oblique approach so that the cutting face is presented inwardly of the periphery of the grinding wheel to avoid non-uniform feed of the cutting face to the grinding surface, and by a curvilinear, preferably arcuate contour of the approach so that the final approach and feeding to the grinding surface is comparatively nearer normal to the grinding surface than the initial advance to avoid inadvertent grinding contact until the cutting surface is in proper position. The extent of feed along the oblique approach is preferably controlled to grind the cutting faces to a uniform rake by an adjustable stop associated with the means for advancing the cutter, and the depth of grinding at a particular rake is controlled by adjustably settable means incorporated in the cutter positioning means to pivot the cutter independent of the rake control.

Uniform grinding of all of the cutting faces rapidly is facilitated by third means acting upon retraction of the cutter from grinding for causing the succeeding cutting face to be positioned for grinding. This is preferably accomplished by an indexer pawl that indexes the cutter by engaging the back face of a cutter tooth and a yieldable holding pawl that engages the back face of a cutter tooth to maintain the cutter at its angular orientation while being yieldable to permit indexing and being adjustable circumferentially of the cutter to adjust the depth of grinding.

In the preferred embodiment of the present invention, this holding pawl is mounted on a member that connects a pair of parallel pivot arms and on which the cutter is positioned, with the pawl and connecting member forming the aforementioned means for positioning the cutter tooth at a particular angular orientation. The parallel pivot arms form the aforementioned means for advancing the cutter in its oblique approach to the grinding wheel and produce a translational movement of the connecting member that maintains the cutter in its angular orientation during approach and grinding. In this embodiment, the rake is controlled by means limiting the extent of pivot of the pivot arms and the grinding depth is controlled by positioning the cutter at the conection of the connecting member to one of the pivot arms and by means for shifting the pivot of the other pivot arm to rotate thereby the cutter about its axis without affecting the rake relation.

The preferred embodiment of the grinding apparatus of the present invention is described in detail below and illustrated in the accompanying drawings, in which:

FIG. 1 is a perspective view of a grinding machine for grinding rotary toothed cutters in accordance with the preferred embodiment of the present invention;

FIG. 2 is an exploded perspective view of the cutter support elements of the machine of FIG. 1;

FIG. 3 is an enlarged plan view of the cutter support elements of the machine of FIG. 1, showing the elements in retracted position;

FIG. 4 is a view similar to FIG. 3, showing the elements in a position intermediate retracted and advanced positions; and FIG. 5 is a view similar to FIG. 3, showing the elements in advanced position for grinding.

Referring first to FIG. 1, the grinding machine 10 is seen to have a base 12 mountable on a table or other platform and on which base 12 is mounted a drive motor behind a rack 14 having pins 16 for storing rotary toothed cutters 18 and a cutter adapter 20. A drive shaft 22 extends horizontally from the drive motor for driving of a grinding wheel 24 of abrasive material, which is fixed for rotation on the shaft by an adapter nut 26.

The grinding wheel 24 is partially enclosed by a protective housing 28 that carries a light 30 to illuminate the wheel. The wheel 24 has a grinding face 32 in a plane normal to the axis of the wheel and facing axially outward for grinding contact by the cutting faces 34 of the rotary toothed cutter 36 that is supported for grinding on a vertical cutter stud 38 adjacent the grinding wheel 24, with the cutting faces 34 being on the counterclockwise sides of the cutter teeth 40 along the recesses 42 between teeth, which location makes the cutting faces 34 somewhat inaccessible for grinding.

The cutter 36 is carried for free rotation on the stud 38 by seating on an intermediate bushing 44 that carries a spring clip 46 within its bore and retained therein between opposed spring retainers 48 to hold the bushing 44 on the stud 38, which stud 38 is secured to a flat cutter plate 50 by threaded attachment of the shank 52 of the stud 38 in a threaded bore 54 in the plate 50 with an annular flange 56 on the stud abutting the plate 50. The stud shank 52 extends downwardly from the plate 50 through an annular shim 58 and a threaded bore 60 in a first pivot arm 62 to which it is attached by a lock nut 64 at the underside of the first pivot arm 62.

Supported on the first pivot arm 62 for pivoting in a horizontal plane is a yieldable holding pawl 66 pivoted on a vertical screw 68 extending down through the pawl, through a washer 70, through a bore 72 in the plate 50 and secured in placed by a nut at the underside of the plate. The holding pawl has a cutter tooth engaging tip 74 extending for engagement between two teeth of the cutter 36 and primarily engaging the back face 76 of one of the teeth 78 to prevent clockwise rotation of the cutter during grinding (see FIG. 5), while being shaped to be displaced by the pressure of the teeth when the cutter is indexed in a counterclockwise direction, as will be described hereinbelow. The holding pawl 66 is yieldably retained in cutter holding position by a coil spring 80 extending from a recess 82 in the side of the cutter plate 50 and pushing against the inner side of a flange 84 of the holding pawl 66 outwardly of the plate 50, with the spring 80 permitting reverse pivoting of the holding pawl 66 to allow indexing of the cutter 36. The holding pawl 66 also has a release finger 86 manually engageable to pivot the pawl out of cutter engagement to accommodate initial seating of a cutter.

The cutter stud 38, plate 50 and holding pawl 66 form the aforementioned means for positioning the cutter 36 with a tooth 40 at a particular angular orientation with respect to the grinding face 32 of the wheel 24. These elements are advanced in an oblique approach (FIG. 3) to the grinding wheel 24 by the aforementioned retractable means that maintains the angular orientation of the cutter 36 during the approach and during grinding.

This second retractable means includes the aforementioned first pivot arm 62, which has a pivot pin 88 depending from an end thereof into a vertical bore 90 in a stationary bearing block 92 that is mounted on the inner side 94 of an upstanding frame 96 that surrounds the cutter supporting and manipulating elements. The pivot pin 88 is retained in the bearing block bore 90 by a snap ring 98 seated on the pin below the block, which block is further formed with a recess 100 in its top face for accommodating without contacting the end of a pivot screw 102 and attaching nut 104 for a second pivot arm 106 that extends from the pivot screw 102 parallel to the first pivot arm 62 to a connection with the cutter plate 50 by means of a connecting screw 108 that extends upwardly through the second pivot arm 106, to which it is secured by a nut 110, and is threadably attached in a bore 112 of the cutter plate 50. The bore 112 is spaced from the cutter stud 38 a distance equal to the spacing between the pivot pin 88 of the first pivot arm 62 and the pivot screw 102 of the second pivot arm 106 to form a parallel pivot arm linkage maintained by the cutter plate connections for imparting translational motion of the cutter plate 50, which serves as a connecting member for the pivot arms upon pivoting of the arms. This translational motion also applies to the cutter 36, which is thereby retained in angular orientation with respect to the grinding face 32 of the grinding wheel 24.

The pivot pin 88 of the first pivot arm 62 and the pivot screw 102 of the second pivot arm 106 are located outwardly of the periphery of the grinding wheel 24 and at a spacing from the grinding wheel face 114 opposite the grinding face 32, which location of the pivots for the pair of pivot arms 62 and 106 provides for movement of the cutter 36 in an arcuate oblique approach to the grinding wheel 24 that presents the cutting face 34 of the cutter 36 to the grinding face 32 of the grinding wheel 24 inwardly of the periphery thereof, with the tip of the cutting face moving in an arcuate path about an effective center, indicated at 116 in FIG. 3, to cause the cutter tooth 40 to initially approach the wheel 24 at only a slight inclination, which avoids contact until near the end of the approach, at which point the arcuate approach disposes the cutting face 34 at a desirable more nearly normal advance to the wheel 24 during grinding.

The pivot screw 102 of the second pivot arm 106 is mounted in a bore 118 in a pivot plate 120 that is pivoted on the pivot pin 88 of the first pivot arm 62 to retain the spacing between the pivots while permitting angular shifting of the pivot of the second pivot arm 106 to adjust the position of the cutter plate 50, holding pawl 66 and cutter 36, thereby adjusting the angular orientation of the cutter tooth 40 with respect to the grinding face 32 of the grinding wheel 24 to adjust the depth of grinding, but without affecting the rake of the ground surface, as the relation of the axis of the cutter 36 to the grinding face 32, which relation determines the rake, is not changed because the cutter axis is at the connection to the first pivot arm 66, which is not moved during adjustment of the second pivot arm 106.

This adjustment of the pivot of the second pivot arm 106 is accomplished by pivoting of the pivot plate 120 about the first pivot arm pivot pin 88, which pivoting is controlled by manipulation of an adjusting screw 122 that bears against a depending flange 124 of the pivot plate 120, which flange extends generally parallel to the pivot arms 62 and 106. The adjusting screw 122 extends outwardly from the pivot plate flange 124 for threaded attachment in a bore 126 in a vertical front plate 128 that is attached by screws 129 to the front end of the bearing block 92. The adjusting screw 122 extends further outwardly through the front 130 of the frame 96 and has an adjuster knob 132 attached to its outer end and fixed thereon by a set screw 134 so that manual rotation of the knob 132 will cause the adjusting screw 122 to move longitudinally in the threaded front plate bore 126 to advance or retract the pivot plate 120, which is retained in following disposition against the inner end of the adjusting screw 122 by a tension spring 136 in back of the pivot plate flange 124 and mounted on a tension rod 138 that is fixed to the front plate 128 by a nut 140 and extends through the pivot plate flange 124 for support of a retainer pin 142 that retains the spring 136 in position against a washer 144 at the pivot plate flange 124.

Manipulation of the pair of parallel pivot arms 62 and 106 to advance and retract the cutter 36 in the aforementioned oblique approach to the grinding wheel 24 is accomplished by a push rod 146 slidable in the front plate 128 and having a pivot screw 148 secured to its inner end by a nut 150, with the pivot screw 148 extending upwardly through an intermediate annular spacer 152 aligned with the pivot plate flange 124 for abutment thereagainst to limit the retracted position of the push rod 146 and threaded in the outer end 154 of the first pivot arm 62 for pivotal manipulation thereof. The push rod has an operating knob 156 threaded on its outer end, which knob also serves to lock an adjusting nut 158 on the rod for limiting inward movement thereof to control the position of the cutter axis during grinding (FIG. 5), which position determines the rake of the cutting face 34 ground on the cutter 36. The push rod 146 is normally retained in a retracted position (FIG. 3) by a return spring 160 mounted on the push rod between the front plate 128 and the adjusting nut 158.

Upon retraction of the cutter 36 following each grinding advance, the cutter is indexed by means for causing the succeeding cutter tooth to be positioned at the same angular orientation as the preceding tooth. This means includes an indexer pawl 162 attached by a vertical pivot screw 164 to a block 166 on the pivot plate 120 outwardly and to the side of the retracted position of the cutter 36.

The block 166 is fixed on the pivot plate 120 by a lock nut 168 on the downwardly extending end of the pivot screw 164 under the pivot plate, and is retained against rotation by a vertical stud 170 seated in the pivot plate 120 and extending through and upwardly from the block into an enlarged aperture in the indexer pawl 162 to allow pivoting of the pawl between limits. A spring 174 on the pivot screw 164, having ends engaging the pawl 162 and an intermediate portion engaging the stud 170 normally urges the indexer pawl into cutter engagement, for which purpose the pawl has a tooth engaging tip 176 disposed for contact of the back face of a cutter tooth upon cutter retraction to index the cutter to present the next tooth for grinding, with the tip 176 of the pawl being disposed to ride over the adjacent tooth upon subsequent cutter advancement. The indexer pawl 162 is further formed with a release finger 178 manually engageable to pivot the indexer pawl 162 out of cutter engagement to accommodate initial seating of a cutter on the cutter stud 38, with the release finger 178 overlapping the release finger 86 of the holding pawl 66 in spaced relation for simple one-hand engagement of both fingers to open the pawls for seating of a cutter. When the pawl fingers are subsequently released, the pawls will engage the cutter teeth to position the cutter for grinding.

After a cutter 36 is seated as just described and before the grinding wheel motor is started, the cutter is advanced from its initial retracted positon (FIG. 3) to grinding position (FIG. 5) and the desired rake, indicated by the angle 180, is set by adjustment of the adjusting nut 158 to control the extent of advance of the push rod 146. The adjusting screw 122 is then advanced to pivot the cutter 36 about its axis to a desired depth of grinding without affecting the rake setting. The push rod 146 is then allowed to return to retracted position and the grinding wheel motor is turned on to rotate the wheel 24.

The machine is now ready to grind the cutting faces 36 of the cutter 34 by simple repeated advancement of the push rod 146 without further worrying with the machine settings. Each time the push rod 146 is advanced, the cutter 36 is moved from its retracted position (FIG. 3) through an intermediate position (FIG. 4) at which the cutter has moved free of the indexer pawl 162 and is positioned by the holding pawl 66 in angular orientation for grinding, which orientation is maintained as the cutter advances in an arcuate oblique approach (see dot-dash lines of FIG. 3) and as the cutting face 34 is being ground (FIG. 5), with the approach being toward the center of the grinding wheel 24 and presenting the cutting face 34 to the grinding face 32 inwardly of the grinding face periphery to assure uniform grinding.

Retraction of the cutter after each grinding stroke causes the indexer pawl 162 to engage the back face of the adjacent cutter tooth and thereby to index the cutter as the cutter completes its return stroke, with the holding pawl 66 yielding to permit indexing and subsequently again engaging the cutter teeth 40 to orient the next cutting face 34 for grinding. This action of the indexing pawl 162 and holding pawl 66 is automatic and requires no attention by the operator, who needs only manipulate the push rod 146 repeatedly until each cutting face 34 has been ground.

If it is necessary to grind the cutting faces further after a first round, the machine can be adjusted simply by advancing the adjusting screw 122 and repeating the sequence of push rod manipulations.

The aforementioned engagement of the indexer pawl 162 and holding pawl 66 with the back faces of the cutter teeth assures orientation of each cutting face for grinding as the back faces are original, unchanged surfaces and disposing the cutter in relation to these back faces assures uniform rake and height of each tooth 40 whereas positioning by engagement of the cutting faces would depend on the extent of previous grinding and would change when a freshly ground face is engaged. Also, engagement of the back faces rather than the cutting faces 34 avoids scratching or otherwise marring of the freshly ground cutting faces.

Although the machine 10 has been described in relation to grinding rotary toothed cutters 36, it is capable as well of grinding other objects. For example, a single edge cutter could be mounted in an adapter 20 of the type shown on the rack 14 in FIG. 1, which adapter is seatable on the cutter stud 38 and has an orienting notch 182 engageable by the holding pawl 66 to position the cutter in proper grinding disposition. Thus, it should be understood that the present invention is applicable to grinding of various objects and the expressions herein and in the appended claims in terms of rotary toothed cutters is for purposes of example only.

It should also be understood that the above detailed description of the preferred embodiment of the present invention was for purposes of exemplification only and that the present invention is applicable to variations and is not intended to be limited thereby except as defined in the appended claims.

We claim:

1. Apparatus for grinding the cutting faces of a rotary toothed cutter, said apparatus comprising a grinding wheel, and a support for presenting said rotary toothed cutter to grind the cutting faces thereof at said grinding wheel, said support incorporating first means for positioning a tooth of said cutter at a particular angular orientation with respect to the grinding face of said grinding wheel to position its cutting face for grinding at a particular angle, and second retractable means for advancing the supported cutter from a retracted position outside the periphery of said grinding wheel in an oblique curvilinear approach path toward said grinding face while maintaining said angular orientation during said advance and during grinding, said approach path being initially generally parallel to said grinding face for advancement of said supported cutter inwardly of said periphery of said grinding wheel free of interference therewith and said approach path terminating in a direction more nearly normal to said grinding face for uniform feeding of said oriented tooth cutting face thereto.

2. Apparatus for grinding the cutting faces of a rotary toothed cutter according to claim 1 and characterized further in that said oblique curvilinear approach extends inwardly toward the axis of said grinding wheel.

3. Apparatus for grinding the cutting faces of a rotary toothed cutter according to claim 1 and characterized further in that said second means advances said cutter in a translational motion that maintains said angular orientation, and said oblique approach is arcuate to increase the angle of approach as said cutting face engages said grinding face.

4. Apparatus for grinding the cutting faces of a rotary toothed cutter according to claim 1 and characterized further in that said second means includes an adjustable stop for limiting the advance of said cutter along said oblique curvilinear approach to control the rake of the ground cutting face of said cutter.

5. Apparatus for grinding the cutting faces of a rotary toothed cutter according to claim 4 and characterized further in that said first means is adjustably settable independent of the rake control of said second means to advance said cutter rotatably about its axis to increase the depth of grinding without affecting the rake of the ground surface as determined by said stop.

6. Apparatus for grinding the cutting faces of a rotary toothed cutter according to claim 1 and characterized further in that said support incorporates third means acting upon retraction of said second means for causing a succeeding cutting face of said cutter to be likewise positioned by said first means.

7. Apparatus for grinding the cutting faces of a rotary toothed cutter according to claim 6 and characterized further in that said third means includes an indexer pawl positioned for indexing engagement of the back face of one of the cutter teeth upon retraction of said second means to index said cutter, to position said succeeding cutter tooth at said angular orientation.

8. Apparatus for grinding the cutting faces of a rotary toothed cutter according to claim 7 and characterized further in that said first means includes a yieldable holding pawl engageable with the back face of a cutter tooth to hold said cutter at said angular orientation and yieldable to permit said indexing of said cutter by said indexer pawl.

9. Apparatus for grinding the cutting faces of a rotary toothed cutter according to claim 8 and characterized further in that said yieldable holding pawl is adjustably settable circumferentially of said cutter to adjust said angular orientation for control of the depth of grinding.

10. Apparatus for grinding the cutting faces of a rotary toothed cutter, said apparatus comprising a grinding wheel presenting a grinding face, and a support for presenting said rotary toothed cutter to grind the faces thereof at said grinding face, said support comprising a pair of parallel pivot arms, a member connecting said pivot arms to maintain them in parallelism and to obtain translational movement of said connecting member upon pivoting of said pivot arms, and means for positioning a rotary tooth cutter on said connecting member outside the periphery of said grinding face for translational movement therewith toward said grinding face to maintain a tooth of said cutter at a particular angular orientation with respect to said grinding face during approach thereto and during grinding of its cutting face, said parallel pivot arms being arranged to cause said cutter tooth to be moved in an arcuate path having an effective center spaced from the plane of said grinding face oppositely with respect to said cutting face.

11. Apparatus for grinding the cutting face of a rotary toothed cutter according to claim 10 and characterized further in that the pivots of said pivot arms are disposed outwardly of the periphery of said grinding face, and in that the radius of said arcuate path is slightly larger than the spacing between said effective center and said grinding face plane.

12. Apparatus for grinding the cutting faces of a rotary toothed cutter according to claim 11 and characterized further by means adjustably limiting the advance of said cutter to said grinding wheel along said oblique approach to control the rake of the ground face of said cutter.

13. Apparatus for grinding the cutting faces of a rotary toothed cutter according to claim 10 and characterized further in that said cutter is positioned at the connection of said connecting member to one of said pivot arms, and means are included for shifting the location of the pivot of the other of said pivot arms at a fixed distance from the pivot of said one pivot arm for pivoting of said connecting member about its connection to said one pivot to adjust the cutter rotatably about its axis and thereby adjust the angular orientation with respect to said grinding face for control of the depth of grinding.

14. Apparatus for grinding the cutting faces of a rotary toothed cutter according to claim 10 and characterized further by an indexer pawl positioned for indexing engagement of the back face of one of the cutter teeth upon movement of said cutter away from said grinding wheel to index said cutter to position a succeeding cutter tooth at said angular orientation for grinding of the cutting surface thereof.

15. Apparatus for grinding the cutting faces of a rotary toothed cutter according to claim 14 and characterized further by a yieldable holding pawl mounted on said connecting member and engageable with the back face of a cutter tooth to hold said cutter at said angular orientation and yieldable to permit said indexing of said cutter by said indexer pawl.

References Cited

UNITED STATES PATENTS

| | | | |
|---|---|---|---|
| 497,313 | 5/1893 | Flint | 51—225 |
| 1,127,443 | 2/1915 | Jerram | 51—225 X |
| 1,836,807 | 12/1931 | Lennon. | |
| 1,909,883 | 5/1933 | Nickerson | 51—234 X |
| 1,987,832 | 1/1935 | Knight | 51—225 X |
| 2,134,751 | 11/1938 | Dunford | 51—225 |

FOREIGN PATENTS

| | | |
|---|---|---|
| 234,205 | 5/1911 | Germany. |
| 539,916 | 9/1932 | Germany. |

HAROLD D. WHITEHEAD, *Primary Examiner.*